United States Patent [19]
Gallo, Jr. et al.

[11] 4,086,010
[45] Apr. 25, 1978

[54] ILLUMINATION SYSTEM UTILIZING TWO OPPOSING DC LAMPS WITH AN OPTIMUM BARREL-SHAPED SLIT

[75] Inventors: Charles F. Gallo, Jr.; Thomas J. Hammond, both of Penfield; James D. Rees, Pittsford, all of N.Y.

[73] Assignee: Xerox Corporation, Stamford, Conn.

[21] Appl. No.: 737,299

[22] Filed: Nov. 1, 1976

[51] Int. Cl.² ............................................. G03B 27/54
[52] U.S. Cl. ............................................................ 355/70
[58] Field of Search .................... 355/3 R, 8, 11, 47, 355/48–51, 66, 67, 69, 70, 71, 77

[56] References Cited

U.S. PATENT DOCUMENTS

| | | | |
|---|---|---|---|
| 3,062,108 | 11/1962 | Mayo | 355/8 |
| 3,330,180 | 7/1967 | Ferguson et al. | 355/8 |
| 3,575,502 | 4/1971 | Eppe | 355/3 R |
| 3,669,538 | 6/1972 | Fowler | 355/67 |
| 3,698,815 | 10/1972 | Thomas | 355/8 X |
| 3,884,576 | 5/1975 | Mochimaru et al. | 355/69 |

FOREIGN PATENT DOCUMENTS 1,079,231  8/1967  United Kingdom ............... 355/8

Primary Examiner—Donald A. Griffin

[57] ABSTRACT

A symmetrical light intensity distribution profile is achieved by placing a pair of similar asymmetrical linear DC gas discharge lamps in parallel position but opposed in polarity. The individual asymmetrical distributions of the lamps combine in a symmetrical total intensity distribution. A desired "butterfly" or other intensity distribution profile can be achieved.

6 Claims, 9 Drawing Figures

ILLUMINATION SYSTEM UTILIZING TWO OPPOSING DC LAMPS WITH AN OPTIMUM BARREL-SHAPED SLIT

BACKGROUND

This invention relates generally to illumination and more particularly to an illumination system for use in a photocopying environment for the purpose of tailoring the illumination profile of an object or document to be copied.

In one form of photocopying apparatus in which this invention might be applied, a flat document platen supports an original document for imaging through a projection lens disposed along the optical path between the object platen and a photoreceptive surface disposed at the image plane of the lens. The photoreceptor is typically disposed on a rotating cylindrical drum. Because of the curvature of the photoreceptor drum, a narrow exposure slit is disposed adjacent to the drum and along its length to limit the image field incident on the photoreceptor.

It is desirable to provide uniform exposure across the width of the photoreceptor, that is along the length of the exposure slit. In order to accomplish this, the object illumination must be nonuniform. One reason for this, as is well known, is that light propagating from an object to its image attenuates outwardly from the image center in proportion to the $\cos^4 \theta$, where $\theta$ is the angle subtended by any spot in the image plane with the optical axis of the system. Another reason why nonuniform document illumination is desirable is the typical use of an exposure slit having other than uniform width along its length. A more thorough discussion of this latter consideration is to be found in application Ser. No. 737,301, filed herewith by Simpson and Rees, the disclosure of which is hereby incorporated by reference in the present specification.

It is an object of this invention to provide an illumination system by which an object is nonuniformly illuminated, thus to provide uniform exposure of the object at its image plane.

SUMMARY OF THE INVENTION

This invention is practiced in one form by a pair of similar linear DC gas discharge lamps mounted side-by-side but opposed in polarity. Such lamps inherently produce an asymmetrical light intensity distribution. By the side-by-side and polarity-reversed mounting, a desired "butterfly" or other intensity distribution profile can be achieved.

For a better understanding of this invention, reference is made to the following more detailed description given in connection with the accompanying drawing.

DRAWINGS

DESCRIPTION

Figure 1:
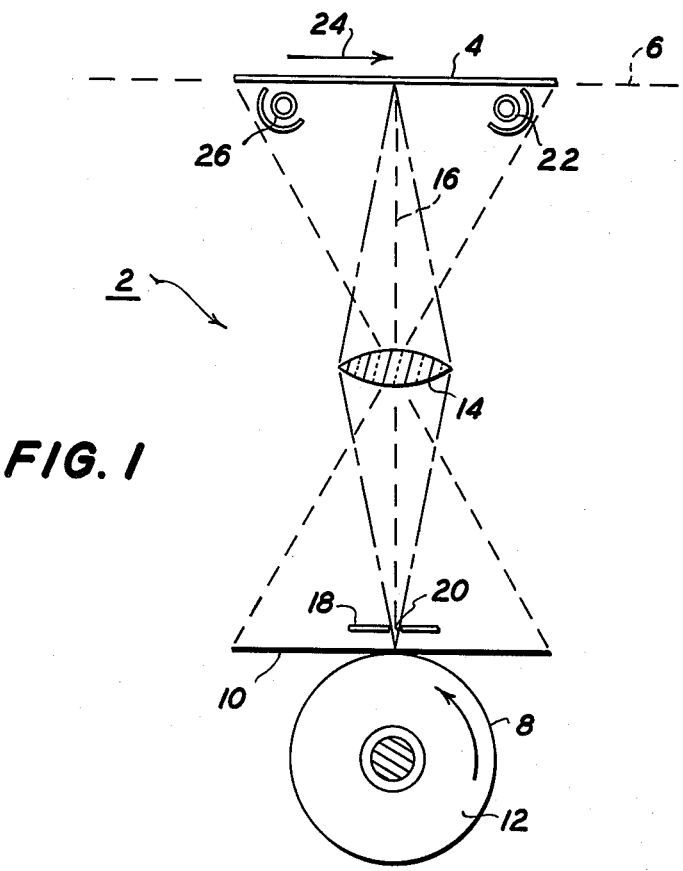
FIG. 1 is an optical diagram of an imaging system showing one environment for application of this invention.

Referring to FIG. 1, an optical system is generally indicated at 2 and includes an object platen 4 disposed in an object plane 6, and a photoreceptor surface 8 disposed at an image plane 10. Photoreceptor 8 may be mounted for rotation on a cylindrical drum 12 which is tangent to the image plane 8. A projection lens 14 is disposed on an optical axis 16 between the object and image planes. A diaphragm member 18 defines an aperture or exposure slit 20 therethrough. A pair of light sources 22 and 26 is located under the object platen 4 to illuminate an object thereon for projection of its image onto the rotating photoreceptor 8. Means represented by arrow 24 are provided to effect scanning movement, either of the object relative to stationary optics or of the optics relative to a stationary object.

Figure 1A:
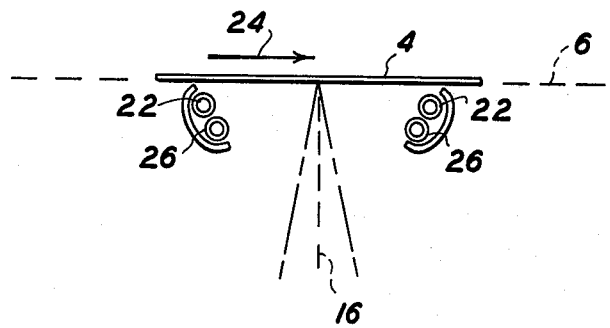
FIG. 1a is a modification of part of the system shown in FIG. 1.

FIG. 1a shows the same environment as FIG. 1 except that lamps 22 and 26 are placed side-by-side in combination as a unit, one such unit on each side of the optical axis 16. Lamps 22 and 26 are identical DC lamps except that they are reversed in polarity relative to each other.

Figure 2:
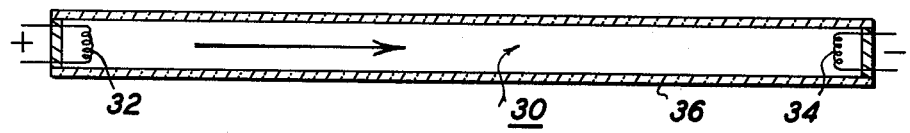
FIG. 2 represents a linear gas discharge lamp.

Referring to FIG. 2, a DC gas discharge lamp is represented at 30 and includes an anode electrode 32 and a cathode electrode 34, these electrodes being suitably connected to a DC power source (not shown). A lamp envelope 36 extends between electrodes 32 and 34 and contains the active gas or vapor. Low pressure mercury argon fluorescent lamps are an example of a vapor lamp that may be used according to this invention.

Figure 3:
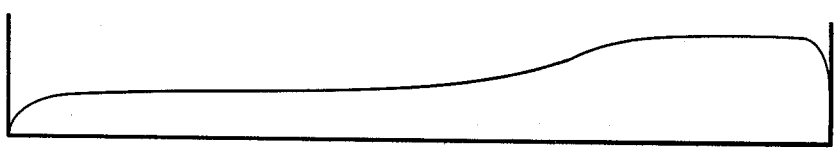
FIG. 3 is an idealized light intensity distribution profile corresponding to the lamp of FIG. 2.

When the circuit connected to the lamp of FIG. 2 is closed, current flows through the lamp as indicated by the arrow, and the light emitted from the lamp has an intensity distribution profile represented in FIG. 3. As is observed, the lamp is brighter at the cathode end than at the anode end. FIG. 3 is illustrative and not definitive of the intensity profile, which may or may not be linear.

Figure 4:
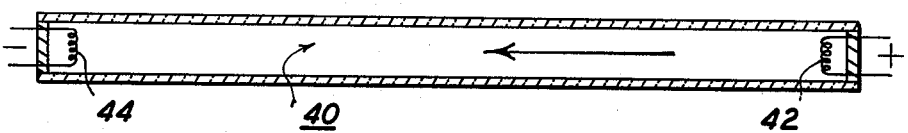
FIG. 4 represents a linear gas discharge lamp similar to that in FIG. 2 but reversed in polarity.
Figure 5:
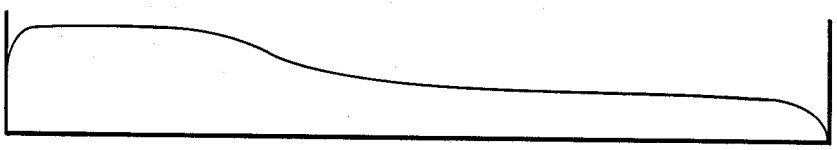
FIG. 5 is an idealized light intensity distribution profile corresponding to the lamp of FIG. 4.

FIG. 4 shows a similar lamp 40 oppositely oriented with its cathode 44 at the left and its anode 42 at the right, and an accompanying light intensity distribution profile in FIG. 5 which is just the opposite of that shown in FIG. 3.

Figure 6:
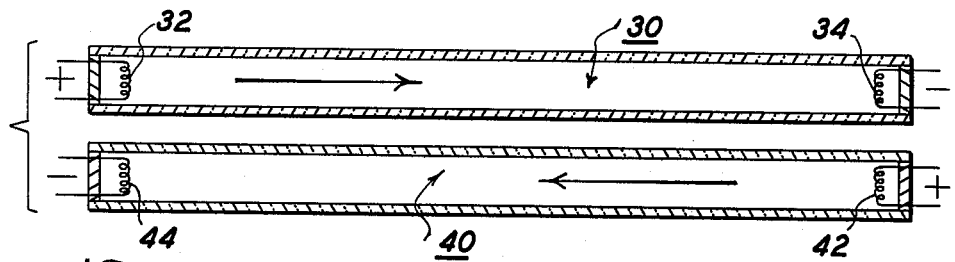
FIG. 6 represents the lamps of FIGS. 2 and 4 placed side-by-side.
Figure 7:
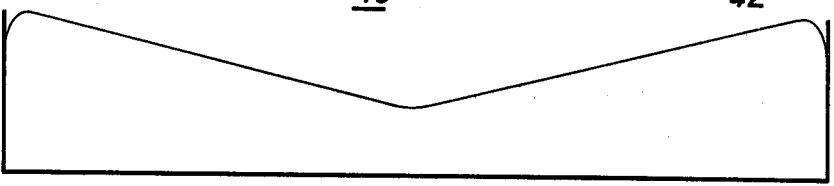
FIG. 7 is an idealized light intensity distribution profile of the combination shown in FIG. 6.

FIG. 6 shows the lamps 30 and 40 positioned in combination to emit a light intensity distribution profile represented in FIG. 7. FIG. 7 can be considered substantially a summation of the curves of FIGS. 3 and 5 and shows the light intensity greater at the ends of the lamp combination than at the center.

Figure 8:
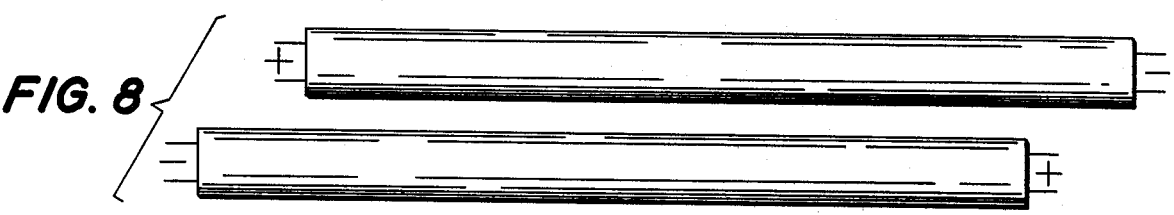
FIG. 8 represents the lamps of FIG. 6 in a slightly modified arrangement.

FIG. 8 shows two opposed DC lamps that are slightly offset to provide further control of the light distribution. From this it will be appreciated that the profile of FIG. 7 can be "compressed" or "stretched" by altering the relative axial positions of the lamps.

There are several factors which influence the light intensity distribution from a DC gas discharge lamp. These include current, cold spot orientation with respect to lamp polarity, and gas or vapor pressure within the lamp envelope as discussed in patent application, Ser. No. 595,936, filed July 14, 1975, by Gallo and Hammond, the disclosure of which is incorporated herein by reference.

With respect to current, higher currents through a DC gas discharge lamp tend to accentuate the asymmetry of intensity distribution represented in FIGS. 3 and 5. Accordingly, higher currents will tend to increase the intensity contrast between the ends and the center of the FIG. 7 profile.

As to cold spot orientation, the asymmetry of FIGS. 3 and 5 is greater than the cold spot is located at the cathode end of the lamp. Again, this variable can be used to accentuate the intensity profile of FIG. 7.

Gas or vapor pressure is also a factor here, the asymmetry of FIGS. 3 and 5 increasing as the lamp vapor pressure decreases. This again is variable to control the intensity profile of FIG. 7.

It will be apparent that this invention permits a control over the distribution of light output intensity along the length of a gas discharge lamp. This control capability finds one practical application in tailoring the illumination profile of an object which is to be optically imaged. $Cos^4 \theta$ exposure attenuation at the image plane, and other factors such as exposure slit non-uniformity, can be compensated for to provide constant exposure across the breadth of the photoreceptor.

The foregoing description of an embodiment of this invention is given by way of illustration and not of limitation. The concept and scope of the invention are limited only by the following claims and equivalents thereof which may occur to others skilled in the art.

What is claimed is:

1. An optical system for projecting an image from an object plane to an image plane, including the following disposed along an optical axis:
    a. an object platen to support an object in said object plane,
    b. a projection lens,
    c. a photoreceptor disposed in said image plane, and
    d. an illumination system to illuminate said object platen including:
        1. a first linear lamp disposed adjacent to and parallel to said object platen, said first lamp being a DC gas discharge lamp having an anode at one end and a cathode at the other end thereof and having an asymmetrical distribution pattern of output light intensity along its length,
        2. a second linear lamp similar to the first and disposed parallel to said first lamp, with the anode and cathode of said second lamp disposed at the ends thereof in the reverse polarity with respect to said first lamp, the asymmetrical distribution patterns of light output intensity of said first and second lamps combining in a resultant symmetrical distribution pattern of output light intensity to illuminate said object platen with non-uniform, symmetrical light intensity along the dimension of said platen corresponding to the length of said lamps to compensate for off-axis light attenuation at said image plane.

2. An optical system as defined in claim 1 in which said first and second linear lamps are disposed adjacent to each other forming an integral light source.

3. An optical system as defined in claim 2, further including a second such integral light source disposed parallel to the first and on the opposite side of said optical axis from said first integral light source.

4. An optical system as defined in claim 1, and further including:
    means to effect scanning of said object platen by said illumination system to incrementally illuminate the object thereon,
    a diaphragm defining an exposure slit adjacent to said photoreceptor to expose only a narrow strip of said photoreceptor to said image,
    whereby a composite image is incrementally projected on said photoreceptor.

5. An optical system as defined in claim 4 in which said resultant symmetrical distribution pattern of output light intensity is of a generally butterfly configuration corresponding to greater light intensity at the ends than at the center thereof.

6. A method of creating a symmetrical distribution pattern of light output intensity in an extended light source including:
    placing a first linear DC gas discharge lamp and a second linear DC gas discharge lamp in parallel juxtaposition with their polarities opposed so that inherent asymmetrical distribution pattern of output light intensity along said first lamp is substantially equal and opposed to the inherent asymmetrical distribution pattern of output light intensity along said second lamp,
    adjustably moving said lamps axially relative to each other to vary the symmetrical distribution pattern of light output intensity as desired.

* * * * *